US008453048B2

(12) United States Patent
Holt et al.

(10) Patent No.: US 8,453,048 B2
(45) Date of Patent: May 28, 2013

(54) TIME-BASED VIEWING OF ELECTRONIC DOCUMENTS

(75) Inventors: Robert Richard Kenneth Holt, Woodinville, WA (US); Christopher N. Haddan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 113 days.

(21) Appl. No.: 13/042,324

(22) Filed: Mar. 7, 2011

(65) Prior Publication Data

US 2012/0233528 A1  Sep. 13, 2012

(51) Int. Cl.
G06F 17/00 (2006.01)

(52) U.S. Cl.
USPC ........................................................ 715/229

(58) Field of Classification Search
USPC ................................................. 715/205, 229
See application file for complete search history.

(56) References Cited

U.S. PATENT DOCUMENTS

| 5,680,558 | A  | * | 10/1997 | Hatanaka et al. | 715/838 |
| 6,012,073 | A  | * | 1/2000  | Arend et al. | 715/236 |
| 6,742,015 | B1 | * | 5/2004  | Bowman-Amuah | 718/101 |
| 6,910,049 | B2 |   | 6/2005  | Fenton et al. | |
| 6,964,009 | B2 | * | 11/2005 | Samaniego et al. | 715/202 |
| 7,028,221 | B2 | * | 4/2006  | Holland et al. | 714/31 |
| 7,373,594 | B1 | * | 5/2008  | Lopez et al. | 715/229 |
| 7,543,005 | B1 | * | 6/2009  | Edelman et al. | 1/1 |
| 7,823,086 | B2 |   | 10/2010 | Perantatos et al. | |
| 2007/0006126 | A1 | * | 1/2007 | Calkins et al. | 717/103 |
| 2007/0136113 | A1 | * | 6/2007 | Wilson | 705/7 |
| 2007/0156726 | A1 | * | 7/2007 | Levy | 707/100 |
| 2007/0192156 | A1 | * | 8/2007 | Gauger | 705/8 |
| 2008/0072290 | A1 | * | 3/2008 | Metzer et al. | 726/3 |
| 2008/0235594 | A1 |   | 9/2008 | Bhumkar et al. | |
| 2010/0100899 | A1 | * | 4/2010 | Bradbury et al. | 725/29 |
| 2012/0069131 | A1 | * | 3/2012 | Abelow | 348/14.01 |

OTHER PUBLICATIONS

"Using Web Content Management (WCM)", Retrieved at<<http://www.alfresco.com/help/webclient/concepts/cuh-wcm-intro.html>>, Retrieved Date: Jan. 3, 2011, pp. 3.
"What is a Content Management System?", Retrieved at<<http://knol.google.com/k/what-is-a-content-management-system>>, Retrieved Date: Jan. 3, 2011, pp. 11.
"Features—Website Content Staging", Retrieved at<<http://www.asbrusoft.com/page.jsp?id=811>>,—Retrieved Date: Jan. 3, 2011, pp. 4.
"Scheduling content to be published in the future", Retrieved at<<http://help.q4websystems.com/entries/39177-scheduling-content-to-be-published-in-the-future>>, Jun. 2, 2009, p. 1.

* cited by examiner

*Primary Examiner* — Laurie Ries
(74) *Attorney, Agent, or Firm* — Wolfe-SBMC

(57) ABSTRACT

Various embodiments provide techniques for time-based viewing of electronic documents. Examples of electronic documents include websites, webpages, text documents, web-based documents, and so on. In at least some embodiments, a time-based viewer is provided that enables a user to select a particular date and/or time for which to view an electronic document. The user can then navigate through the electronic document and view how the document will appear or did appear at the selected date and/or time. In at least some embodiments, a page container is provided that can include definitions for different versions of a page of an electronic document. According to some embodiments, the different versions of the page can correspond to different publication dates for the page. In some implementations, the time-based viewer can access a page container to retrieve a particular version of a page for display.

20 Claims, 8 Drawing Sheets

TIME-BASED VIEWING OF ELECTRONIC DOCUMENTS

BACKGROUND

Many types of electronic documents undergo occasional revisions. Additionally, different pages of an electronic document can be revised for publication at different times. For example, different webpages included as part of a website can be updated with new content and published at different times. When preparing pages of an electronic document for future publication, a user may want to view the page in context, e.g., as the page will appear in the context of other pages of the electronic document at the time of publication. Many content editors simply allow a user to view a page being edited in isolation without providing an indication as to how the page will appear in the context of other linked pages (e.g., webpages) at a future publication date.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for time-based viewing of electronic documents. Examples of electronic documents include websites, webpages, text documents, web-based documents, and so on. In at least some embodiments, a time-based viewer is provided that enables a user to select a particular date and/or time for which to view an electronic document. The user can then navigate through the electronic document and view how the document will appear or did appear at the selected date and/or time. In the context of a website, the time-based viewer can enable a user to navigate through webpages of the website as they will appear at a future publication date or did appear at a past publication date. In at least some embodiments, the time-based viewer allows multiple versions of an electronic document that correspond to different publication dates to be viewed.

Further to some embodiments, a page container is provided that can include definitions for different versions of a page of an electronic document. For example, a particular page container can be associated with a webpage, and the page container can include different versions of the webpage. According to some embodiments, different versions of a page can correspond to different publication dates for the page. In some implementations, the time-based viewer can access a page container to retrieve a particular version of a page for display.

BRIEF DESCRIPTION OF THE DRAWINGS

The same numbers are used throughout the drawings to reference like features.

DETAILED DESCRIPTION

Overview

Various embodiments provide techniques for time-based viewing of electronic documents. Examples of an electronic document (hereinafter "document") include a website, a webpage, a text document, a web-based document, and so on. In at least some embodiments, a time-based viewer is provided that enables a user to select a particular date and/or time for which to view a document. The user can then navigate through the document and view how the document will appear or did appear at the selected date and/or time. In the context of a website, the time-based viewer can enable a user to navigate through webpages of the website as they will appear at a future publication date or did appear at a past publication date. In at least some embodiments, the time-based viewer allows multiple versions of a document that correspond to different publication dates to be viewed.

Further to some embodiments, a page container is provided that can include definitions for different versions of a page of an electronic document. For example, a particular page container can be associated with a webpage, and the page container can include different versions of the webpage. According to some embodiments, different versions of a page can correspond to different publication dates for the page. In some implementations, the time-based viewer can access a page container to retrieve a particular version of a page for display.

In the discussion that follows, a section entitled "Operating Environment" is provided and describes one environment in which one or more embodiments can be employed. Following this, a section entitled "Example Page Container" describes an example page container in accordance with one or more embodiments. Next, a section entitled "Example User Interfaces" describes example user interfaces in accordance with one or more embodiments. Following this, a section entitled "Example Preview Scenario" describes an example document preview scenario in accordance with one or more embodiments. Next, a section entitled "Example Methods" describes example methods in accordance with one or more embodiments. Last, a section entitled "Example System" describes an example system that can be utilized to implement one or more embodiments.

Operating Environment

Figure 1:
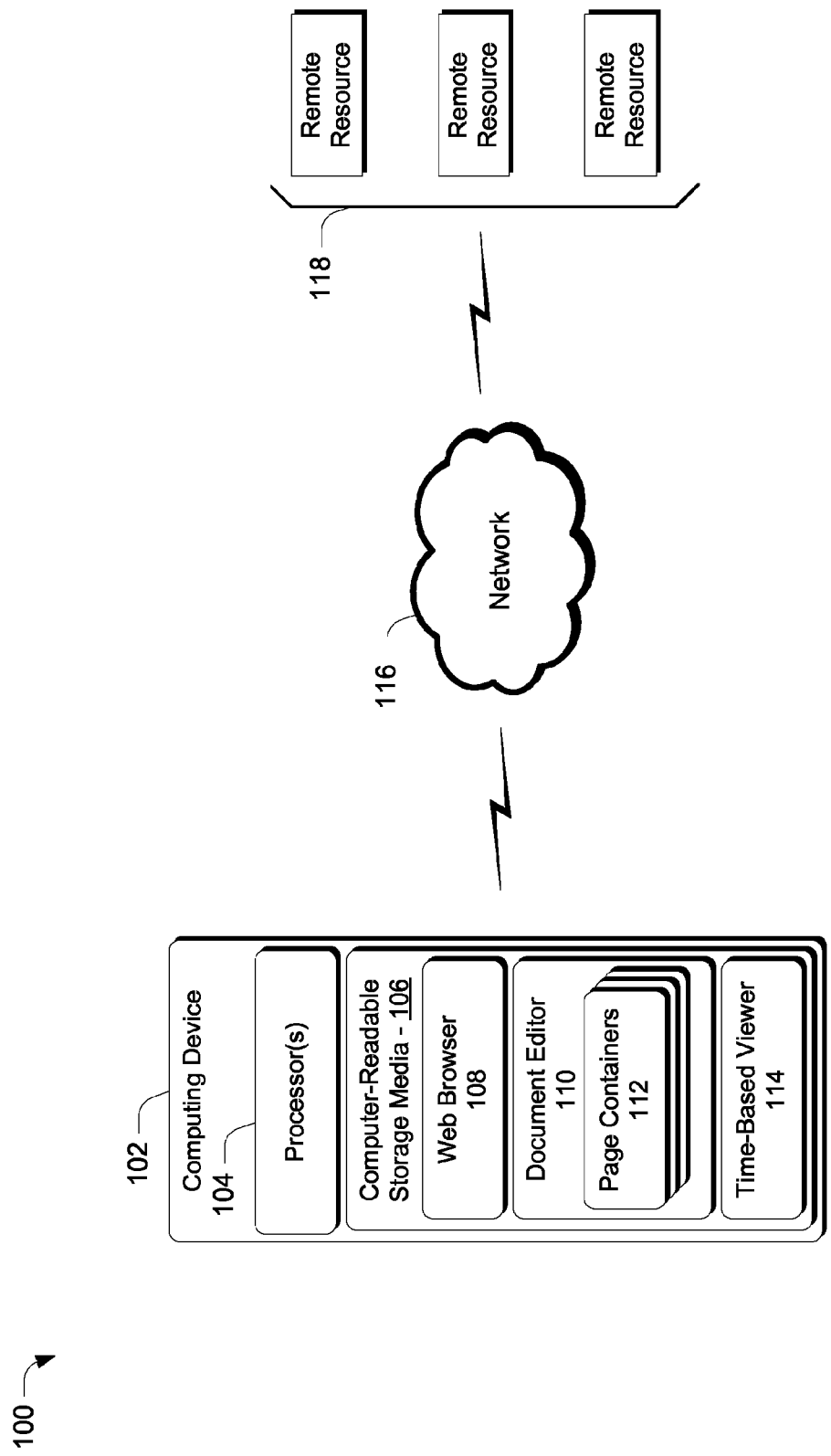
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104 and one or more computer-readable storage media 106. The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 8.

In addition, computing device 102 includes an application in the form of a web browser 108 that can be utilized via the computing device to access content such as a document, e.g., a webpage. The computing device 102 also includes a document editor 110 and one or more page containers 112. In at least some embodiments, the document editor is configured to enable documents such as webpages to be edited and published online. The page containers 112 are associated with pages of documents and in some embodiments enable different versions of a page to be created and maintained. A more detailed discussion of the page containers 112 is provided below.

Computing device 102 also includes a time-based viewer 114 that is configured to enable versions of a document and/or pages of the document to be viewed based on a particular date. For example, a user can indicate a future date and the time-based viewer can retrieve pages of a document that correspond to the date. In at least some embodiments, this can enable multiple versions of a document to be created for different publication dates (e.g., by the document editor 110) and can enable the multiple versions to be previewed prior to publication. In the context of a website, multiple different versions of a webpage associated with the website can be created and each version can correspond to a different publication date. The time-based viewer 114 can retrieve one of the versions of the webpage based on a particular publication date and can enable navigation through the website based on how pages of the website will appear or did appear at the publication date.

In addition, environment 100 includes a network 116, such as the Internet, and one or more remote resources 118 with which the computing device 102 can communicate. Examples of the remote resources 118 include a remote web server, a cloud computing resource, and so on. In some example embodiments, the computing device 102 can retrieve documents from the remote resources 118.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of an example page container in accordance with one or more embodiments.

Example Page Container

Figure 2:
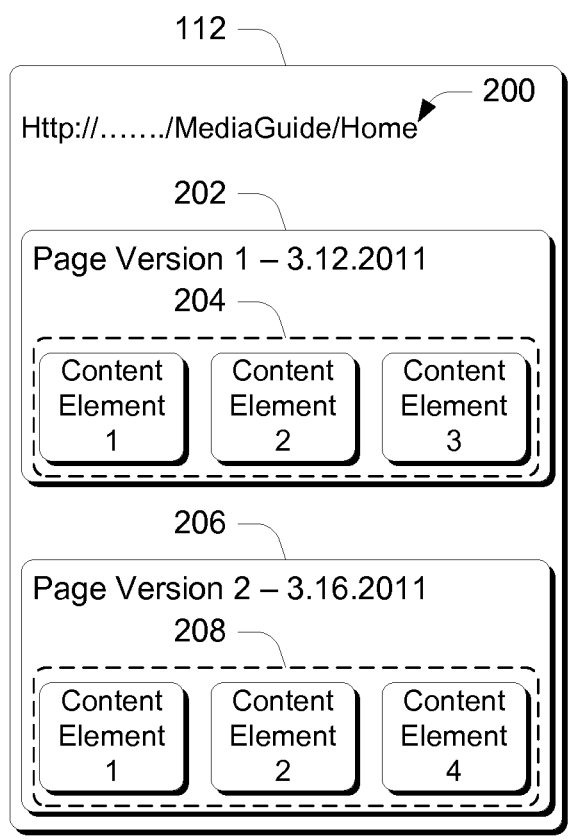
FIG. 2 illustrates an example page container in accordance with one or more embodiments.

FIG. 2 illustrates one of the page containers 112 in more detail in accordance with one or more embodiments. As discussed above, in at least some embodiments the page container 112 can include information about a page and/or a portion of a document. In this particular example, the page container 112 includes an address 200 that can be used to label and/or retrieve the page container. Examples of the address 200 include a uniform resource locator (URL), a uniform resource identifier (URI), a network address, and so on.

The page container 112 also includes a page version 202 that includes content elements 204. According to one or more embodiments, the page version 202 can include information about a particular version of a page, such as a version number, a publication date, documents with which the page version is associated, other pages with which the page version is associated, and so on. The content elements 204 include information about content for the page version 202. For example, the content elements 204 can include instances of and/or references to text content, images, video, audio, and so on. In the context of a webpage, a particular content element can include content for a portion of the webpage.

Also included as part of the page container 112 is a page version 206 which in turn includes content elements 208. In at least some embodiments, the page version 206 represents a version of a portion of a document that is different in one or more respects than a version represented by the page version 202. For example, content included as part of the content elements 208 can differ from the content included as part of the content elements 204. In at least some embodiments, different page versions (e.g., the page version 204 and the page version 208) can enable different versions of a page to be created and used for publication at different times.

While not expressly illustrated here, in at least some embodiments a page version can include references to other pages and/or documents. A reference to different page can be date-specific and thus can be used to retrieve a version of the different page that corresponds to a particular date, e.g., the publication date of the page version. For example, in the context of a website, a page version can represent a webpage and the page version can include a link or other reference to a different webpage of the website.

In at least some embodiments, the page version 202 and/or the page version 206 can each be associated with a particular workflow status. For example, a workflow status for a particular page version can indicate that the page version is approved, rejected, or is pending review. Thus, a page version can track a workflow status of the page version and changes to the workflow status can be stored as part of the page version.

Example User Interfaces

Figure 3:
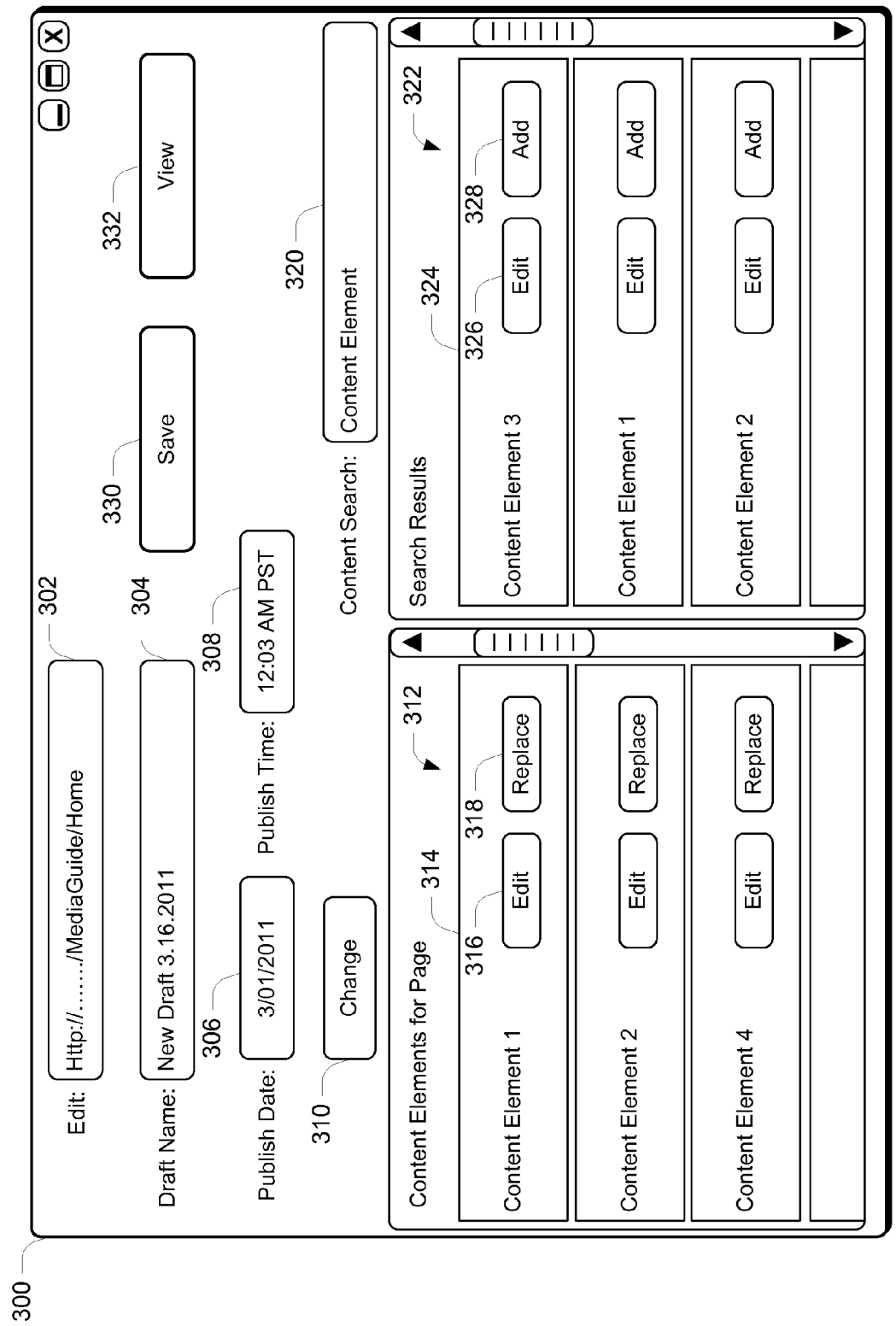
FIG. 3 illustrates an example user interface in accordance with one or more embodiments.

FIG. 3 illustrates an example user interface that can be used to edit documents, generally at 300. In at least some embodiments, the user interface 300 can be used to select content to be used to populate all and/or a portion of a document, such as a webpage.

The user interface 300 includes an address field 302 and a draft name field 304. In at least some embodiments, the address field 302 is configured to display an address for a page of a document that is being edited via the user interface 300. For example, a user can provide a URL or other address for a webpage to be edited via the user interface. In accordance with one or more embodiments, the draft name field 304 is configured to enable a user to provide a name for a page of an electronic document that is being edited. For example, the name can correspond to a particular version of a page that is being edited via the user interface 300.

Also included as part of the user interface 300 is a publish date field 306 and a publish time field 308. In at least some embodiments, the publish date field 306 and the publish time field 308 enable a user to indicate a date and time on which a page being edited is to be published. For example, a date and time can be indicated for a webpage that is to be published as part of a website. A change button 310 can be actuated to present a calendar or other instrumentality (not illustrated) that can be used to select a date and/or time for publication of a page.

The user interface 300 further includes a content region 312 that is configured to be populated with indications of content to be used for a particular page. In this particular example, the content region 312 includes several content elements, e.g., from the content elements 204 and/or 208, discussed above in reference to FIG. 2. As part of the content elements is a content element 314 that includes and/or references a particular instance of content to be used to populate a page.

The content element 314 includes an edit button 316 and a replace button 318. The edit button 316 can be pressed to enable the content element 314 to be edited. For example, pressing the edit button 316 can enable content to be added to or deleted from the content element 314. The replace button 318 can be pressed to enable the content element 314 to be replaced with a different content element.

Also included as part of the user interface 300 is a search field 320 and a search results region 322. In at least some embodiments, the search field 320 can be used to enter search terms to be used to search for content (e.g., content elements) to be used to populate a page. For example, a user can enter a search term in the search field 320 and the results of the search can be displayed in the search results region 322. In this particular example, the search results region 322 includes a content element 324 that includes an edit button 326 and an add button 328. In at least some embodiments, the edit button 326 can be pressed to edit content associated with the content element 324. The add button 328 can be pressed to cause the content element 324 to be added to a page being edited, e.g., to the content region 312.

The user interface 300 further includes a save button 330 and a view button 332. In at least some embodiments, the save button 330 can be pressed to cause edits to a page to be saved. For example, the content elements included as part of the content region 312 can be saved for a particular page and/or page version. The view button 332 can be pressed to enable a visual view of a page being edited via the user interface 300 to be displayed. For example, pressing the view button 332 can cause a preview of a webpage that includes content from the content region 312 to be displayed.

Figure 4:
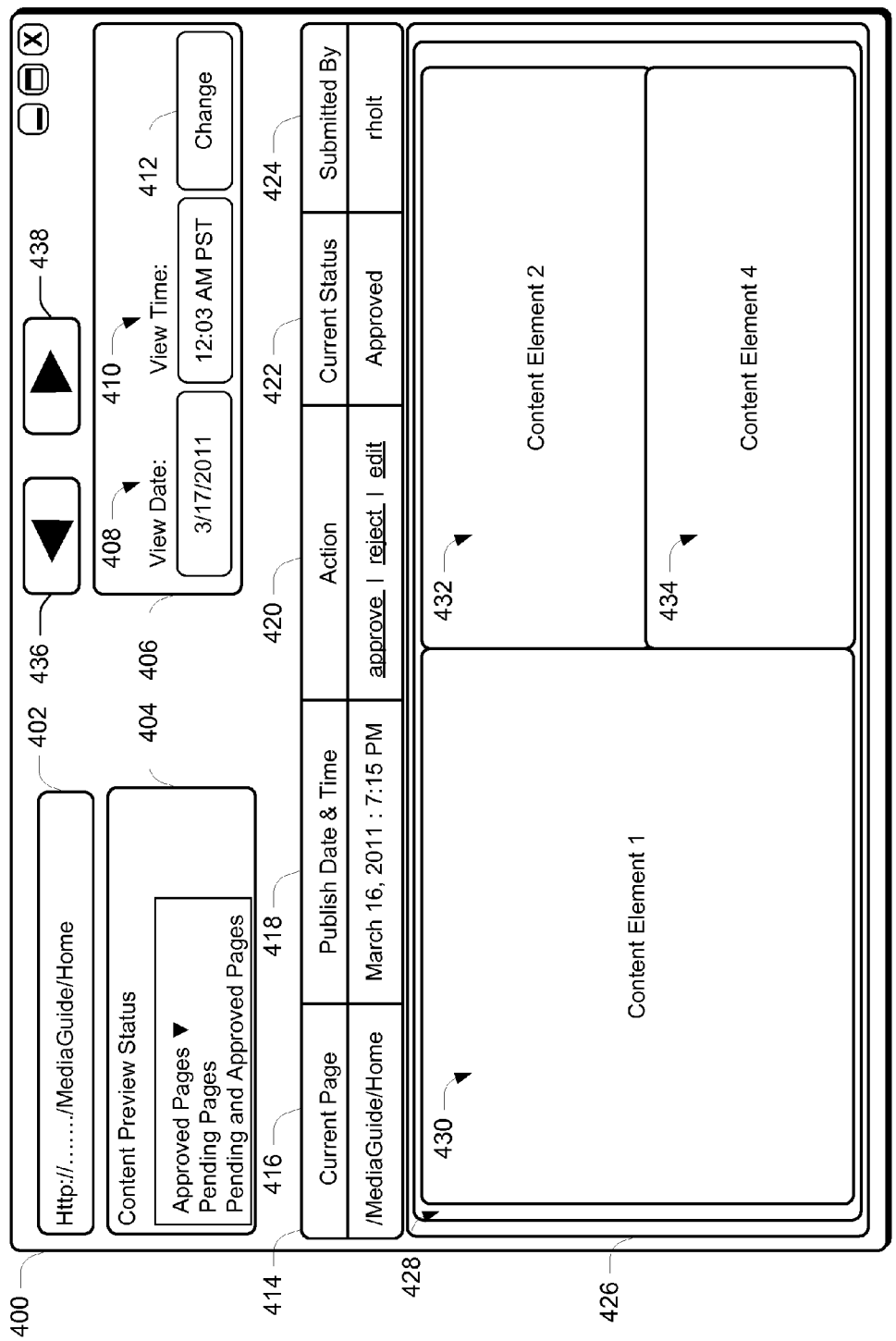
FIG. 4 illustrates an example user interface in accordance with one or more embodiments.

FIG. 4 illustrates an example user interface that can be used to view documents, generally at 400. In at least some embodiments, the user interface 400 can be used to view versions of documents and/or versions of pages of documents based on a particular publication date and/or time. For example, the user interface 400 can be displayed responsive to the view button 332 of the user interface 300 (discussed above) being pressed.

Included as part of the user interface 400 is an address field 402 that can be populated with an address to a page that is being viewed via the user interface 400. For example, a user can enter an address into the address field 402 to cause a particular document and/or page of a document to be accessed via the user interface 400. The user interface 400 also includes a status field 404 that enables a workflow status to be selected for viewing a document. For example, a user can indicate a workflow status of "approved pages", "pending pages", or "pending and approved pages" to be used to filter and retrieve pages of a document.

Further included as part of the user interface 400 is a viewing parameters region 406 which includes a view date field 408, a view time field 410, and a change button 412. In at least some embodiments, the view date field 408 and the view time field 410 indicate a view date and view time for a page that is displayed via the user interface 400. For example, a user can enter a date into the view date field 408 and a time into the view time field 410. This date and time can then be used to retrieve and display a version of a page of a document (e.g., as indicated in the address field 402) that will be published at that date and time. In at least some embodiments, the date and time can be used to retrieve previously published pages and/or pages that are scheduled for future publication. According to some embodiments, the change button 412 can be pressed to enable the date and/or time to be changed.

Also included as part of the user interface 400 is a page data region 414 that includes information about a page being viewed via the user interface 400 and actions that can be performed that affect the page. For example, the page data region 414 includes a page address field 416, a publish date field 418, an action field 420, a status field 422, and a personnel field 424. In this particular example, the page address field 416 includes a page address for a page that is displayed via the user interface 400. The publish date field 418 includes a date and/or time of publication for a page being displayed. In at least some embodiments, the date and/or time of publication can refer to a planned future publication date, a current publication date, or a past publication date.

According to at least some embodiments, the action field 420 includes various actions that can be performed with respect to a page being viewed via the user interface 400. In this particular example, the action field 420 includes several selectable functions, such as an "approve" function, a "reject" function, and an "edit" function. In at least some embodiments, the approve function can be selected to cause a page being viewed via the user interface 400 to be approved as part of a workflow, the reject function can be selected to cause the page to be rejected, and the edit function can be selected to enable the page to be edited. In some example implementations, selecting the edit function can cause the user interface 300 (discussed above with reference to FIG. 3) to be displayed such that the page can be edited via the user interface 300.

In at least some embodiments, the status field 422 indicates a workflow status of a page (e.g., approved, pending, rejected, and so on) and the personnel field 424 indicates personnel associated with the page.

The user interface 400 also includes a content region 426 that is configured to display various types of content, such as a page of a document. In this particular example, the content region 426 displays a page 428 that includes content elements 430, 432, and 434. In at least some embodiments, the page 428 corresponds to a version of a page that is retrieved based on information indicated by the various fields of the user interface 400, such as the address field 402, the status field 404, and the parameters region 406.

Also included as part of the user interface 400 is a back button 436 and a forward button 438. In at least some embodiments, the back button and the forward button can be used to navigate through content, e.g., through pages of a document displayed via the content region 426.

In an example implementation scenario, the user interface 400 can be used to preview pages of a document based on a future publication date. For example, a future date and/or time can be entered via the view date field 408 and/or the view time field 410. A page version can then be retrieved (e.g., one of page versions 202 or 206 discussed above) based on the date and/or time and displayed via the content region 426. A user can then navigate between the different pages of the document to view a version of the document that is scheduled to be published at the particular date and/or time.

Example Preview Scenario

Figure 5:
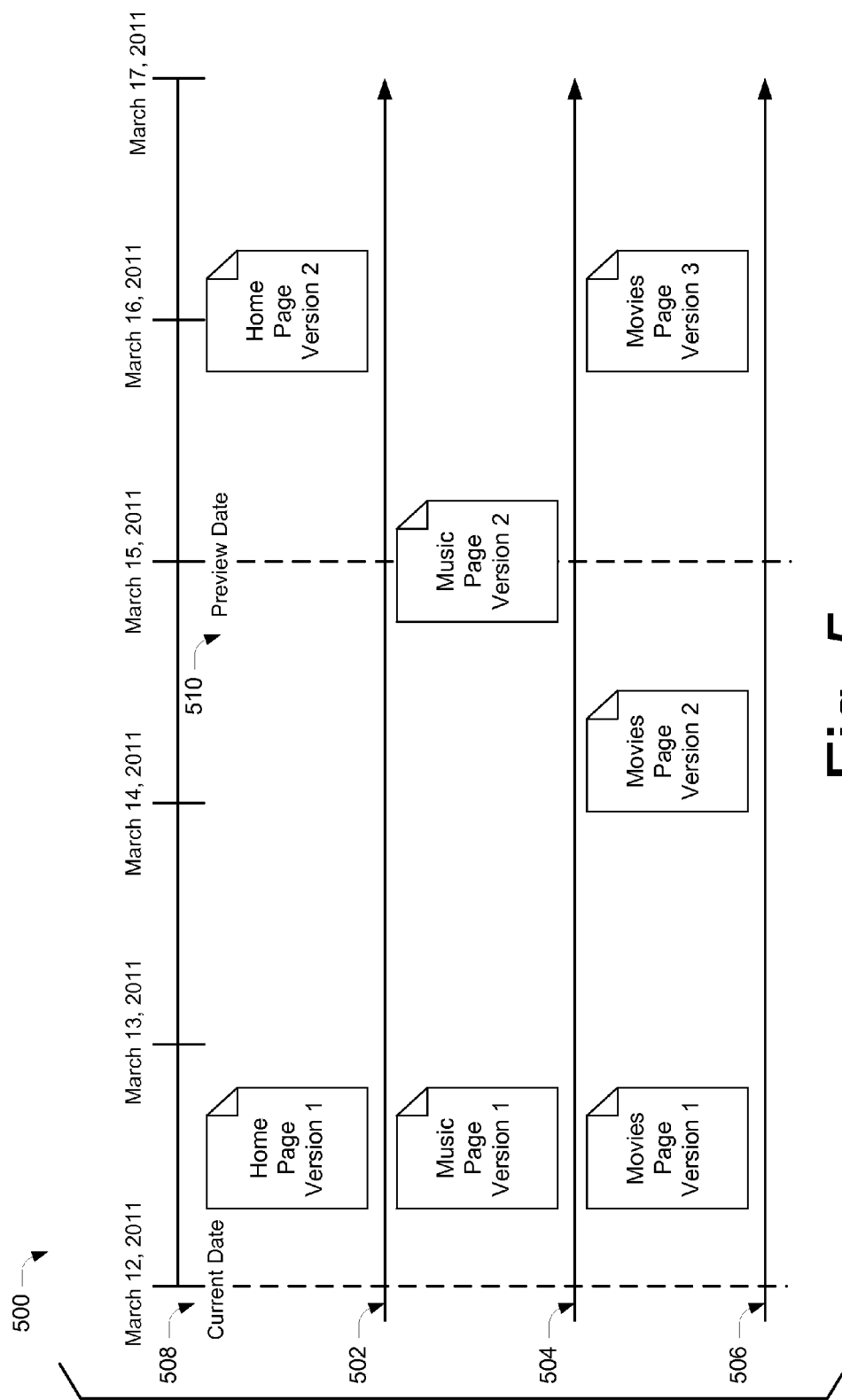
FIG. 5 illustrates an example document preview scenario in accordance with one or more embodiments.

FIG. 5 illustrates an example document preview scenario, generally at 500. The document preview scenario 500 includes representations of several versions of pages of a document, e.g., a home page, a music page, and a movies page. In at least some embodiments, these pages correspond to webpages of a website. Also included as part the document preview scenario are a home page timeline 502, a music page timeline 504, and a movies page timeline 506. According to one or more embodiments, each of the timelines corresponds to a publication timeline for a respective page.

The document preview scenario further includes a current date 508 and a preview date 510. The current date 508 indicates a date on which the pages of the document are being previewed and the preview date 510 indicates a date to be used to retrieve versions of the pages. In at least some embodiments, the document preview scenario can be implemented via the user interface 400 discussed above with reference to FIG. 4. For example, the preview date 510 can be provided to the view date field 408 to be used to retrieve and display pages of a document.

In this particular example scenario, a user can navigate between the different pages of the document (e.g., via the user interface 400) and view versions of the pages that are published as of the preview date 510. For example, the user can view the "Home Page Version 1", the "Music Page Version 2", and the "Movies Page Version 2". According to at least some embodiments, the versions correspond to page versions included as part of a page container, e.g., the page container 112. In at least some embodiments, the preview date 510 can be moved forward and backward along the various timelines to view different versions of the pages.

Example Methods

Figure 6:
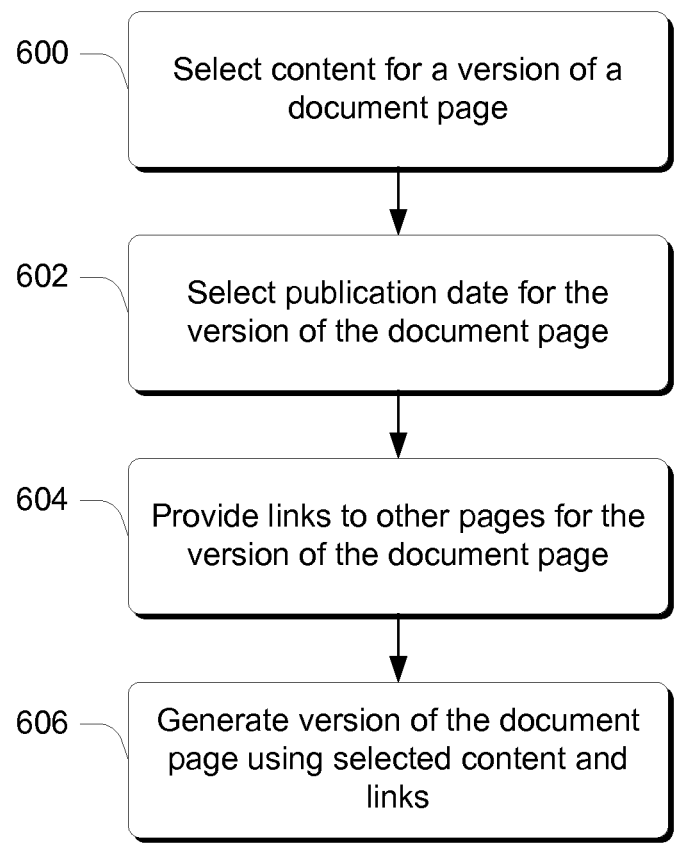
FIG. 6 illustrates an example method in accordance with one or more embodiments.

FIG. 6 is a flow diagram that describes steps a method in accordance with one or more embodiments. The method can be implemented in connection with any suitable hardware, software, firmware, or combination thereof In at least some embodiments, the method can be implemented via the document editor 110 and/or the time-based viewer 114, discussed above with reference to environment 100.

Step 600 selects content for a version of a document page. For example, the content can be selected via the user interface 300 discussed above. In at least some embodiments, the version of the document page can be included as part of the page container 112. Step 602 selects a publication date for the version of the document page. For example, with reference to user interface 300, the publish date field 306 and/or the publish time field 308 can be used to indicate a publish date and/or time for the version.

Step 604 provides links to other pages for the version of the document page. For example, the links can include links (e.g., hyperlinks) to versions of other pages that are scheduled to be published at the publication date for the page version. In at least some embodiments, the other pages can include other pages of the document and/or pages of other documents. Step 606 generates the version of the document page using the selected content and the links. For example, the page version can be generated as part of the page container 114. In at least some embodiments, the page version can be previewed, e.g., via the user interface 400.

Figure 7:
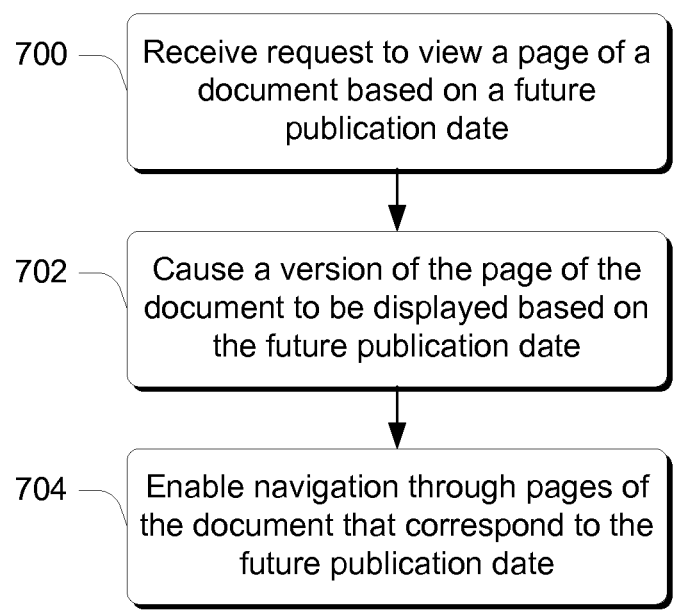
FIG. 7 illustrates an example method in accordance with one or more embodiments.

FIG. 7 is a flow diagram that describes steps a method in accordance with one or more embodiments. The method can be implemented in connection with any suitable hardware, software, firmware, or combination thereof In at least some embodiments, the method can be implemented via the time-based viewer 114, discussed above with reference to environment 100.

Step 700 receives a request to view a document based on a future publication date. In at least some embodiments, the request to view the document can be made via the user interface 400, discussed above with reference to FIG. 4. Step 702 causes a version of the document to be displayed based on the future publication date. For example, a page of the document with a publication date that corresponds to the requested date can be displayed.

Step 704 enables navigation through pages of the version of the document that correspond to the future publication date. For example, the user interface 400 can be used to navigate through pages of the document with publication dates that correspond to the particular date.

Having described methods in accordance with one more embodiments, consider now an example system that can be utilized to implement one or more embodiments.

Example System

Figure 8:
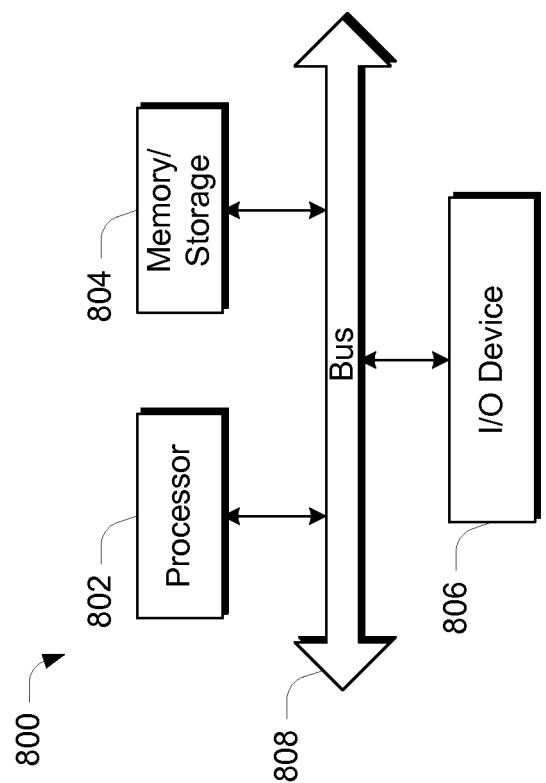
FIG. 8 illustrates an example system that can be used to implement one or more embodiments.

FIG. 8 illustrates an example computing device 800 that can be used to implement the various embodiments described above. Computing device 800 can be, for example, computing device 102 and/or one or more of remote resources 118 of FIG. 1.

Computing device 800 includes one or more processors or processing units 802, one or more memory and/or storage components 804, one or more input/output (I/O) devices 806, and a bus 808 that allows the various components and devices to communicate with one another. Bus 808 represents one or more of any of several types of bus structures, including a memory bus or memory controller, a peripheral bus, an accelerated graphics port, and a processor or local bus using any of a variety of bus architectures. Bus 808 can include wired and/or wireless buses.

Memory/storage component 804 represents one or more computer storage media. Component 804 can include volatile media (such as random access memory (RAM)) and/or non-volatile media (such as read only memory (ROM), Flash memory, optical disks, magnetic disks, and so forth). Component 804 can include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments provide techniques for time-based viewing of electronic documents. Examples of electronic documents include websites, webpages, text documents, web-based documents, and so on. In at least some embodiments, a time-based viewer is provided that enables a user to select a particular date and/or time for which to view an electronic document. The user can then navigate through the electronic document and view how the document will appear or did appear at the selected date and/or time. In at least some embodiments, a page container is provided that can include definitions for different versions of a page of an electronic document. According to some embodiments, the different versions of the page can correspond to different publication dates for the page. In some implementations, the time-based viewer can access a page container to retrieve a particular version of a page for display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving a request to view a page of an electronic document based on a future publication date;
causing a version of the page of the electronic document to be displayed based on the future publication date;
enabling navigation from the version of the page through other pages of the electronic document that correspond to the future publication date.

2. The computer-implemented method of claim 1, wherein the electronic document comprises a website, and wherein the page of the electronic document comprises a webpage of the website.

3. The computer-implemented method of claim 1, wherein the page of the electronic document has multiple versions and wherein each of the multiple versions has a different publication date.

4. The computer-implemented method of claim 1, wherein receiving the request further comprises receiving the request to view the page of the electronic document based on a workflow status of the page.

5. The computer-implemented method of claim 1, wherein enabling navigation further comprises enabling navigation through the other pages of the electronic document based on a workflow status of the other pages.

6. The computer-implemented method of claim 1, wherein the version of the page includes a date-specific reference to one or more of the other pages of the electronic document, and wherein causing navigation comprises following the date-specific reference to the one or more of the other pages.

7. The computer-implemented method of claim 1, further comprising:
receiving input indicating a change to a workflow status of the version of the page; and
updating the workflow status of the page responsive to the input.

8. One or more computer readable storage media embodying computer readable instructions for implementing a graphical user interface, the graphical user interface comprising:
a parameters region for receiving a date parameter;
a content region for displaying a version of a page of a document that corresponds to the date parameter; and
navigation buttons for navigating from the page to other pages of the document that correspond to the date parameter.

9. The one or more computer readable storage media of claim 8, wherein the date parameter comprises a publication date for the version of the page.

10. The one or more computer readable storage media of claim 8, wherein the parameters region is further configured to receive a time parameter, and wherein the content region is further configured to display a version of the document that corresponds to both the date parameter and the time parameter.

11. The one or more computer readable storage media of claim 8, wherein the graphical user interface further comprises selectable workflow statuses that can be used to filter one or more of multiple versions of the page or multiple versions of the other pages for display.

12. The one or more computer readable storage media of claim 8, wherein the graphical user interface further comprises selectable functions that, if selected, enable the version of the page to be approved or rejected as part of a workflow associated with the document.

13. The one or more computer readable storage media of claim 8, wherein the graphical user interface is configured to display a workflow status of the version of the page.

14. The one or more computer readable storage media of claim 8, wherein the content region is further configured to enable searching for content items, adding content items, and editing content items.

15. One or more computer readable storage media embodying computer readable instructions, the instructions being configured to implement:
a page container that includes an address for a page of a document; and
page versions that each correspond to a different version of the page, each of the page versions including a respective collection of content for the page, being associated with a different publication date, and further including a reference to a different page of the document that enables navigation from the page to the different page.

16. The one or more computer readable storage media of claim 15, wherein the page comprises a webpage, and wherein the page versions each correspond to different versions of the webpage.

17. The one or more computer readable storage media of claim 15, wherein one or more of the page versions is associated with a future publication date.

18. The one or more computer readable storage media of claim 15, wherein the reference is further configured to enable a navigation to a version of the different page that is associated with a publication date of the one or more page versions.

19. The one or more computer readable storage media of claim 15, wherein one or more of the page versions are configured to track a workflow status of a respective version of the page.

20. The one or more computer readable storage media of claim 15, wherein one or more of the page versions are configured to be retrieved responsive to a date-specific request for the one or more of the page versions.

* * * * *